United States Patent [19]
Nordberg

[11] 3,751,659
[45] Aug. 7, 1973

[54] LIGHTING SYSTEM FOR VEHICLES
[76] Inventor: Birger Nordberg, 5 Lovstaplatsen, Vasteras, Sweden
[22] Filed: Aug. 17, 1970
[21] Appl. No.: 64,601

Related U.S. Application Data
[63] Continuation of Ser. No. 711,059, March 6, 1968, abandoned.

[30] Foreign Application Priority Data
Mar. 8, 1967 Sweden.............................. 3157/67

[52] U.S. Cl...................... 240/7.1, 240/48, 240/49
[51] Int. Cl............................................. B60q 1/00
[58] Field of Search........................ 240/7.1, 48, 49

[56] References Cited
UNITED STATES PATENTS
2,666,193 1/1954 Keegan............................ 240/48 X Primary Examiner—Samuel S. Matthews
Assistant Examiner—Michael C. Harris
Attorney—Holman, Glascock, Downing & Seebold and Holman & Stern

[57] ABSTRACT

A lighting system for vehicles in which individual units are provided for illuminating limited portions of the field of vision in front of the vehicle in the direction of travel which is primarily intended for motor vehicles and is such as to illuminate the road and any moving or stationary obstacles in front of the vehicle, thereby utilizing the driver's eyesight so that it is given the optimum conditions possible under which to function whereby accidents may be prevented.

8 Claims, 18 Drawing Figures

PATENTED AUG 7 1973  3,751,659

Inventor
Birger Nordberg

LIGHTING SYSTEM FOR VEHICLES

This application is a continuation of application Ser. No. 711,059 filed Mar. 6, 1968, now abandoned.

This invention relates to lighting system for motor driven vehicles for road and rail travel.

Vehicles at present available are equipped with headlamps which provide for alternative illumination of the high beam and low beam. With or without the addition of parking lamps, a certain position-indicating effect is obtained, which is of importance for ensuring that the vehicle is observed by oncoming drivers. Systems are also available in which the vehicle is equipped with curve lamps actuated by the steering mechanism of the vehicle and which are of the high beam or low beam type.

However, all the lighting systems of such type now in use provide unsatisfactory illumination of the field of vision in the direction of travel when meeting approaching. By switching to low beam illumination, the stretch of roadway close to and beyond the meeting point is too weakly illuminated and the vehicle should be driven at a much lower speed when encountering oncoming traffic than is usually the case.

As a rule, the area of the vehicle parking lamps is far too small and provides insufficient luminosity to be observed in a satisfactory manner. Furthermore, the low beam system normally provides unsuitable luminosity in traffic in areas provided with street lighting. The object of this invention is to eliminate the above disadvantages and to provide a system of lighting that affords excellent long distance or road illumination, proper illumination when meeting oncoming vehicles, good near distance illumination and position-indicating illumination.

In general, a lighting system for vehicles should satisfy the following requirements:

a. the entire field of vision in front of the vehicle should be illuminated throughout the entire period of time in which vehicles approach and pass each other in opposite directions, b. for a motor vehicle, the entire field of vision on and about the roadway should be illuminated regardless of the course taken by the road in a horizontal or vertical direction, c. glare when meeting oncoming vehicles should be reduced, d. glare due to reflections from a wet roadway should be reduced, e. illumination intensity should be maintained at a high level within the entire field of vision, f. contrast and silhouette effects should be as high as possible, and g. visibility should be excellent at the same time the effects of glare are low.

To a large extent these requirements can be satisfied by this invention, which is characterized in that the lighting system embraces at least one unit of chiefly long-range nature for use primarily when meeting oncoming vehicles and possibly supplemented by a unit of main beam nature and additionally a unit of close-range nature and/or, further, a unit for position-indicating purposes, whereby each such unit is arranged to focus on a certain portion of the field of vision in front of the vehicle and one or more beams of light from the unit for long distance illumination arranged to describe a continuous oscillating movement in laterally relation to the direction of travel of the vehicle.

With such a lighting system it is possible to satisfy the above-mentioned requirements and the deliberate attempt to give the units in the lighting system focused beams of light, according to this invention, is especially important. This focusing can be achieved in a known manner by providing sectors of a lamp lens with different cross-sections if the reflector is of a parabolic type. Focusing can also be achieved by the design of a lamp's reflector or light source, as well as by a combination of all three of the components.

A reflector is normally of parabolic configuration and a cross-section at right angles to the optical axis therefore forms a circle. If such a cross-section forms an ellipse, the reflector will give a line-focused light beam, provided the light source is located at or near the focal point of the parabolas. A parabolic reflector can be given such an elliptical cross-section if it is subjected to a diametrical, deforming tensional force. The length of the focused line will be dependent on the relationship $a/b$ at different cross-sections through the reflector at right angles to the optical axis, where $a$ is the major axis and $b$ the minor axis in a cross-sectional ellipse. The relationship should increase continuously from the vertex and outward along the optical axis. The beam of light from such a lamp can be given asymmetrical properties by applying tensional forces at points which are not diametrically located. By dividing such a reflector into segments and repositioning these segments, it is possible to obtain different patterns of light lines in a cross-section through the beam of light. The distribution of the luminous flux is determined by the size of the different segments and an asymmetrical effect can be achieved by using cross-sections which do not pass radially through the reflector.

Desired focusing should be achieved through a combination of a suitably shaped lens and the requisite design of the reflector. It is possible with the aid of a single lamp to obtain focusing lines in one or more directions, but focusing lines can, of course, also be obtained with several lamps constructed in the above manner.

The light beam of the passing lamp should consist of one, two or more finger-like focused regions at ground level in the long-range zone, which are oriented chiefly in the direction of travel of the vehicle. Such a long distance zone can be considered to embrace an area between 36 or 48 yards to about 275 yards in front of the vehicle. The close distance zone then embraces an area between 0 and 40 to 50 meters in front of the vehicle. Within the close distance zone the illuminated portion of the road in front of the vehicle should comprise at least one region illuminated by focused light which is directed chiefly at right angles to the direction of travel of the vehicle. This illumination can be achieved either with the aid of the close distance unit, the unit of long distance or with a combination of these units.

It is suitable if the unit for position-indicating purposes is focused to illuminate from part of its light-emitting area one or more narrow regions in the close distance zone, with the longitudinal axes thereof being mainly parallel to or coincident with one or both sides of the vehicle. In addition, the unit for position-indicating purposes should provide non-focused light from part of its light-emitting area of sufficient luminosity to make the vehicle, clearly visible to oncoming drivers.

The present lighting system can be so constructed that the unit of long distance, close distance and position-indicating purposes individually or collectively include one or more lamps operating interdependently in the system.

In conventional lighting systems on a motor vehicle, the main beam illumination must be lowered when meeting oncoming traffic, which results in poor conditions of visibility and fatigue in the driver's eyesight, so that meeting oncoming traffic always involves a degree of danger. According to this invention, a considerable improvement can be attained in that the unit for long distance illumination may remain switched on when meeting oncoming traffic since this unit is so constructed as to execute an oscillating lateral movement with a sweep time longer than 0.5 seconds but shorter than 5 seconds, preferably approximately 2 seconds, with each spot beam of light from the long distance lamp being focused in a vertical plane whereby the solid angle of the best illuminated portions in the long distance zone is less than 0.35 steradians for 50 percent of the luminous flux in the spot beams in the case that the flux is delineated by locus curves for constant illumination intensity in a vertical plane approximately 44 yards in front of the vehicle.

Viewed from an oncoming driver, the long distance lamp with its limited solid angle will appear to be varying and this varying will not be glaring if the angular velocity of the light beam in the horizontal plane, in combination with the width of the focused rays of light, gives an illumination period for the eye of the oncoming driver of approximately 0.1 seconds in duration. Light-varying can be endured without discomfort as long as the frequency is lower than approximately 2 cycles per second. For the driver of an oncoming vehicle, the sweeping long distance or passing lamp which comes towards him will constitute an improved contrast effect for irregularities in the road surface and their contours. Focused beams of light sweeping in a vertical plane will appear to follow the contours of the road within the field of vision and the eye will rest within the area of light that is of chief interest while the peripheral vision will register details within the adjacent areas of light. Practical tests have shown that the eyes of an oncoming driver fairly soon adapt to a constant varying light and begin to blink in time with the light, which further reduces the tendency to cause glare.

This invention will be described with reference to an illustrative embodiment thereof shown in the accompanying drawings in which.

Figure 1:
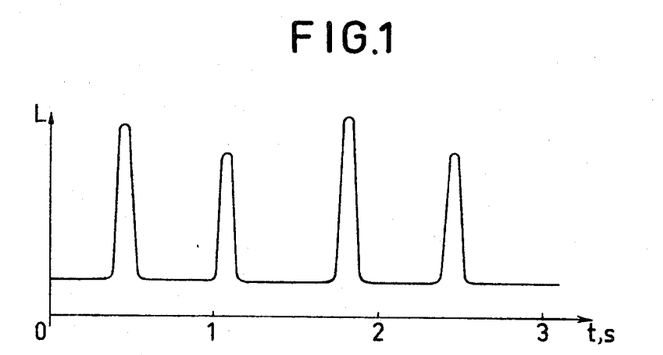
FIG. 1 shows an example of the time sequence for the passing lamp.

FIG. 1 shows an example of the time sequence for the luminosity of the long distance lamp, in which the ordinate indicates the luminosity L for the viewer and the abscissa indicates the time $t$, expressed in seconds. Through a choice of the time derivatives $dL/dt$ of the luminosity $L$ it is possible to adapt the illumination to the normal blink rate of the eye. Sweep time of the long distance lamp is defined as the length of time required for the oscillating motion of the light beam.

Figure 2:
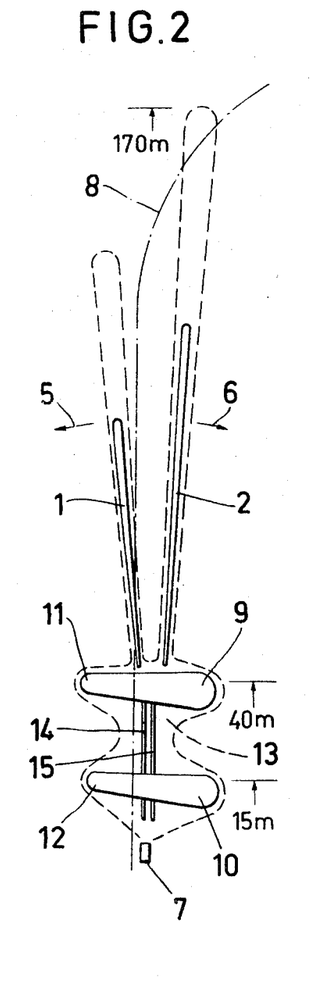
FIGS. 2 and 3 show examples of the light distribution for the different lighting units in the system.
Figure 3:
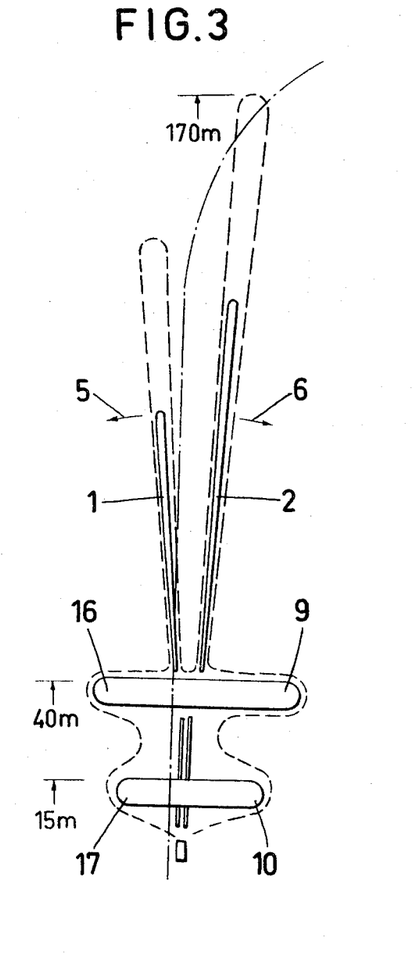

FIGS. 2 and 3 illustrate examples of the light distribution at a certain instant of time at ground level in front of a motor vehicle 7, which is travelling along a road with a center line 8. The long distance lamp has two finger-like focused regions of illumination 1 and 2 each covering an angle of 2°, which execute a sweeping, lateral motion as indicated by arrows 5 and 6. The solid lines in the regions of illumination indicate the locus of a certain constant illumination intensity. Since the regions of illumination 1 and 2 execute the sweeping motion simultaneously while remaining in the same position relative to each other, it is evident that the road will be effectively illuminated even when of a curving nature. The region of illumination (2) closest to the nearest side of the road can, as shown in FIGS. 2 and 3, be permitted to project further ahead in the direction of travel, whereby long distance illumination can be given a certain asymmetrical property.

FIG. 2 discloses a lighting system in which long distance and close distance illumination is provided by different units. Close distance illumination is provided mainly within region 13 and has a lateral sub-region 9 at approximately 40 meters in front of the vehicle and another lateral sub-region 10 at approximately 15 meters in front of the vehicle. Portions 11 and 12 of the sub-regions 9 and 10 are of particular importance for glare effects and extend across the center line 8 of the road and at the same time help to indicate the position of the vehicle. This indication of the position of the vehicle is improved by a position-indicating lamp which, as shown in FIG. 2, gives two focused lines within the close distance zone, the longitudinal direction of which is, in this case, mainly parallel to or coincident with the sides of the vehicle. This line focusing gives an illumination of the road which can be comprehended as an overtaking signal by drivers of bicycles or motorcycles and at the same time can be clearly seen at crossroads, road junctions and pedestrian crossings. The desired focusing can be achieved by one or two lamps with parabolic reflectors and a suitably designed lens. In addition to the line-focused illumination which should be greater than 10 percent but less than 70 percent of the total luminous flux from one and the same lamp and which should be distributed at ground level within narrow regions which, at a distance of approximately 15 meters in front of the vehicle, should have a width of between approximately 0.2 and 0.7 meters and which are defined as being delineated by a locus curve for constant illumination intensity which is approximately 70 percent of the maximum illumination intensity, a position-indicating unit should provide a luminosity which with the lamp power of the parking light is as large, when viewed by the observer, as the lowered beam illumination in a conventional lighting system but from an area which is considerably larger than the area of the parking lights which are in use at the present time.

FIG. 3 shows a lighting system in which long distance and close distance illumination is projected from the same unit. Through suitable focusing of the close distance unit two transverse sub-regions 9' and 10' are obtained in this case as well, but one or both of these sub-regions executes a sweeping lateral movement together with the passing lamp illumination regions 1' and 2'. Since the motion of region 10' occurs in the direction of the region's maximum longitudinal extent, the field of vision there, if region 10' covers a wide enough angle, will receive constant illumination. Portions 16 and 17 will then have the same effect as portions 11 and 12 in FIG. 2.

Figure 4:
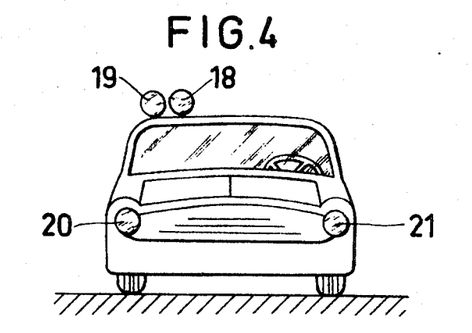
FIGS. 4 and 5 show examples of the location of the units on a motor vehicle.
Figure 5:
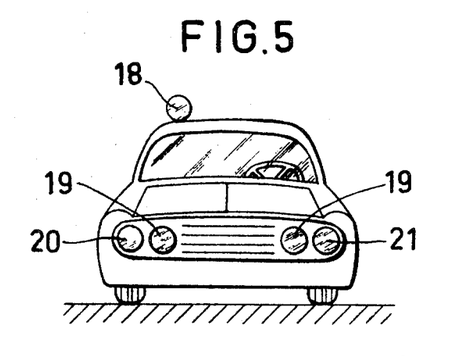

Lighting units can be located in different ways. FIGS. 4 and 5 illustrate examples of location on motor vehicles. The long distance lamp should be placed as high as possible and as far from the center line of the road as possible. If the steering wheel is positioned on the side of the vehicle nearest to the center line of the road, this location helps to ensure that a better foglight effect is obtained than if the steering wheel and long distance lamp unit were located on the same side of the vehicle, since the volume of air nearest the driver would reflect a comparatively small quantity of light when the long distance light executes its sweeping motion. Additionally, an oncoming driver will see the varying light in the fog at an early stage. FIG. 4 shows the location of the close distance lamp 19 besides the long distance lamp unit 18 while the unit for position-indicating comprises two lamps 20 and 21, located in the same position as conventional headlamps. FIG. 5 discloses how the unit for close range illumination comprises two lamps 19a placed besides headlamps 20 and 21 for position-indicating purposes. However, the units can be combined in numerous other ways and some can be incorporated in the same housing, which will be described in connection with FIGS. 9–11. It is important to note that the lighting units can very well be combined with the normally used, conventional lighting system on a motor vehicle, whereby the long distance lamp should primarily be used to supplement the lowered beam illumination in order to define a passing light. Main beam illumination can then be used in the normal manner, of course.

Figure 6:
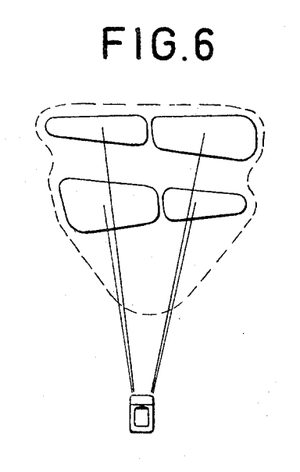
FIGS. 6, 7 and 8 show examples of the light distribution in the close distance zone.
Figure 7:
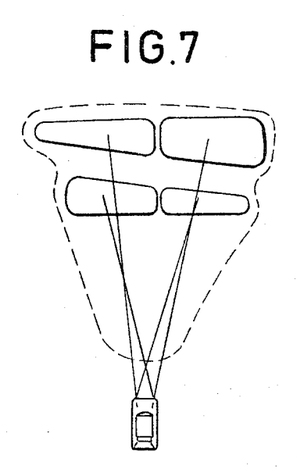
Figure 8:
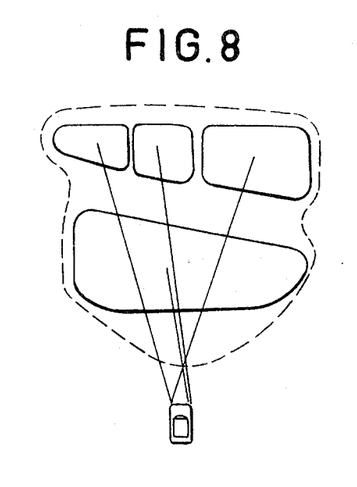

According to this invention, the rays of light projected by the close distance lamp should be focused to form two or three extended light regions mainly at right angles relative to the direction of travel of the vehicle whereby, if the illumination at ground level at a distance that is less than approximately 60 meters in front of the vehicle gives such locus curves for constant illumination intensity that the so delineated luminous flux with high illumination intensity is approximately 50 percent of the luminous flux from the close distance unit of, with at least one of the illumination regions being of an area which is less than approximately 60 percent of the minimum circumscribed circle for the same region of illumination. The system can also be arranged in such a way that one or more rays of light from the close distance lamp are focused to form a region of illumination which mainly covers the side of the road nearest to the vehicle. FIGS. 6, 7 and 8 are diagrammetic views showing some examples of the distribution among illuminated regions of the luminous flux from the units for short or close distance illumination. In these figures solid lines are drawn from the lamps unit to the center of the regions. The regions can form two parallel lateral rows in front of the vehicle. In FIG. 6 two rows are formed, with one comprising regions 61 and 62 and the other regions 63 and 64, while in FIG. 7, regions 71, 72 and 73,74, respectively are formed in another manner. The regions can be formed in still another way in FIG. 8 with such regions being identified 81, 82 and 83,84, respectively. Due to the lateral line-focusing effect obtained, an oncoming driver is given the impression of a varying light when these regions are passed which is above all less irritating on a wet road surface than conventional lowered illumination which can cause appreciable glare.

Figure 9:
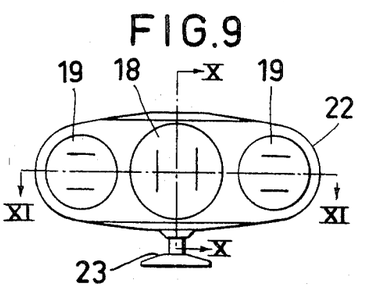
FIG. 9 shows an example of a unit with long and close distance lamps and FIGS. 10 and 11 show two different cross-sections of the same unit.
Figure 10:
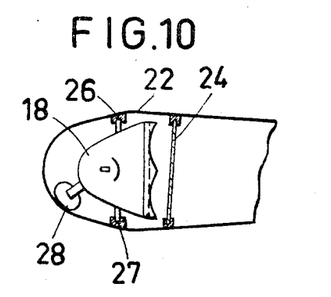
Figure 11:
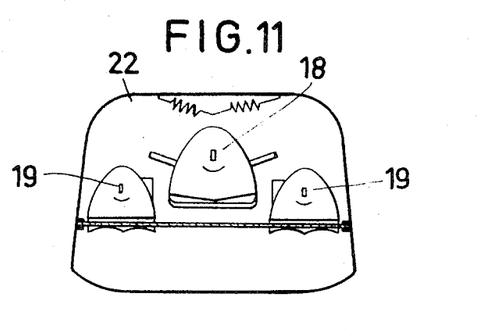
Figure 12:
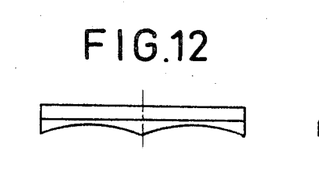
FIGS. 12–15 show examples of lens configuration and FIGS. 16–18 show in more detail the construction of a lamp intended for use as a passing lamp.
Figure 13:
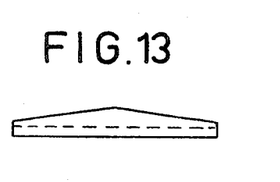
Figure 16:
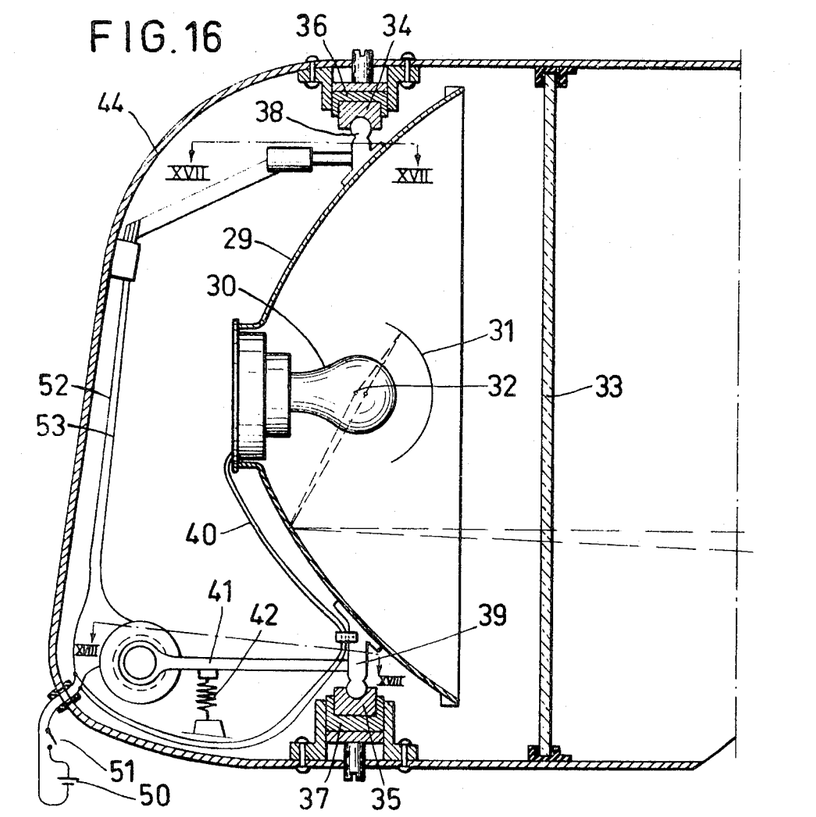
Figures 17, 18:
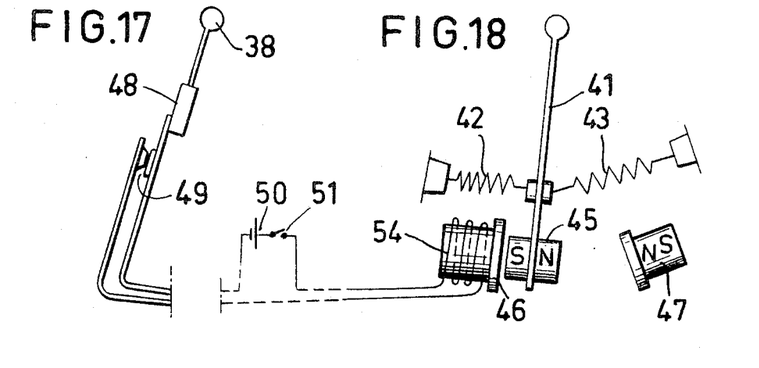

Since the lighting units can be given widely varying forms and can be combined in numerous different ways, it is not feasible to describe every possible combination and method of construction. FIGS. 9–11 therefore show only one example of construction while FIGS. 16–18 show more detailed diagrammetic views of an oscillating lamp. In FIGS. 9–11, a lamp for long distance illumination 180 and two lamps 190, 190 for close distance illumination are mounted in a common housing 22, supported by a mounting plate 23. In the lens of the lamp, which can be common to all lamps, at least for the non-moving units, straight lines are used to indicate how the focused lines are oriented. These lines are consequently vertical in the lamp 180 for long distance illumination and horizontal in lamps 190 for close distance illumination. It will be evident from FIG. 10, that the housing should preferably have a recessed lens 24 from FIG. 11, it will be seen that the lens 24 is common to the two lamps 190. FIG. 10 gives an indication of how the sweeping motion of the long distance lamp can be achieved. Lamp 180 is therefore journalled in vertically arranged bearings 26, 27 and can be caused to execute an oscillating motion about these bearings by a driving means 28, which may, for example, consist of a rotating motor or an electromagnetic device of a kind suitable for this purpose. For this purpose, such driving means may be used, for example, as are intended to drive wind shield wipers. FIG. 11 shows how the headlamps can be positioned in the common housing 22.

Since this lamp unit does not include units for position-indicating purposes, which must be arranged separately, a special advantage is gained in that the lens of the long distance and close distance units may be recessed as such an arrangement effectively counteracts the accumulation of dirt on the lens and further reduces the tendency to cause glare to oncoming drivers.

The oscillating motion of the ray or rays of light projected by the passing lamp can also be achieved by causing the reflectors in the lamp to describe an oscillating motion about a mainly vertical axis whereby the light source of these headlamps is located on the fixed or on the moving part.

It is also possible to achieve the oscillating motion by imparting an oscillating motion to the light source of one or more of the lamps with the aid of a driving means or the like in a lateral plane relative to the focal point of the reflectors of these lamps.

If desirable, the neutral position of the laterally oscillating light beam of the long distance lamp can be laterally adjustable so that when meeting oncoming drivers this light beam is allowed to illuminate one half of the road at the same time as the headlamps are switched to low beam illumination. In this case, only one sweeping focused beam of light to provide passing illumination would probably be sufficient, since the lamps of two vehicles coming from opposite directions would supplement each other until the time when the normal main beam illumination is switched on.

Figure 14:
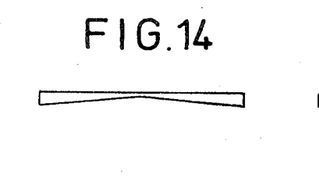
Figure 15:
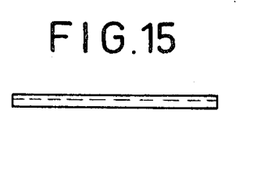

FIGS. 12, 13 and 14, 15 show two ways of constructing the lens in order to obtain line-focused light. If, for instance, a lens according to FIGS. 14, 15 is used for a lamp, the desired light distribution can be obtained if a reflector is used with the parabolic area thereof being deformed plastically with the aid of suitable tools so that the $a/b$ relationship along the optical axis provides a line of light of suitable length coupled with an asymmetrical deformation in order to give asymmetrical properties about this line. a and b thus indicate the major axis and minor axis respectively in the elliptical cross-section through the reflector at right angles to the optical axis, obtained through deformation. According to FIGS. 14 and 15 the lens is prismatic on both sides of the center line in FIG. 14, i.e. along a line extending between the left-hand and right-hand terminal points in FIG. 15. If the line coincides with the major axis of the reflector, two parallel lines of light are obtained which in a cross-section of the light beam forms the sides of a rectangle. If, on the other hand, the line is rotated through a certain angle in relation to the major axis, two parallel lines of light are obtained which form the sides of a trapezoid. The length relationship between these lines of light can be altered by displacing the lens at right angles to the major axis and a result of which, the luminous flux distribution between the lines is altered at the same time. Using two lamps it is thus possible to combine two lines from each lamp in different ways to give lines of greater length, which can be utilized, for instance, to give the lines of light shown in FIGS. 6–8 for close-distance illumination distribution.

FIGS. 16–18 illustrate in more detail the construction of a lamp for passing illumination. A reflector which has been deformed from an original parabolic shape can provide light distribution for passing illumination according to FIGS. 2 and 3 by a in a cross-section through the optical axis, after which the optical axes of the halves thus obtained are separated by a certain angle with a practically common vertex. Deformation can also be achieved through pressing. Transitional surfaces between the two (or three) line-focusing portions of the reflector which, in a pressing process, will be joined together, can be coated with a black, non-reflecting material. A small secondary ellipsoidal screening reflector is mounted in front of a bulb 30. The major axis of this latter ellipsoid should pass through filament 32 of the bulb which also comprises one of the focal points of the ellipsoid. The other focal point is located close to the filament, whereby the focusing properties of a large reflector 29 are utilized to optimum advantage if its focal point is located between the focal points of the ellipsoid close to the filament 32. According to this form of construction, focusing has been achieved without the aid of lens 33, which consequently need not incorporate the special line-focusing deformation. It is thus possible to obtain a lamp in which the moving part is low in weight, which is particularly important with regard to the journalling and damping properties of the moving mechanism. Bearings 34, 35 can, for example, consist of plain bearings which, with the aid of damping elements 36, 37 with a relatively large contact surface, rest against and locate pivots 38, 39. When assembling the bearings, the elastic properties of the reflector can also be utilized in order to provide a certain degree of pre-tensioning as the pivots are attached directly to the reflector. Current for the bulb 30 is preferably supplied via two extremely flexible conductors 40 which are carried through a lead-in close to one of the bearings so that they are not subjected to strain due to the oscillating motion of the reflector. Attached to the lower pivot 39 is a lever 41 which is held in a neutral position with the aid of two tension springs 42, 43 of which one of the springs 42 is visible in the figure. These springs are attached to the lever and to fixed points such as a housing 44, which encloses the lamps and in which the lens 33 and bearings 34, 35 are mounted. The tension springs also can be replaced by helical springs at the bearing journals and at the same time can deliver current to the bulb. Lever 41 is used to cause the reflector 29 to describe an oscillating motion and FIG. 18 shows this portion of FIG. 16 as seen from above. A permanent magnet 45 is attached to the free end of lever 45 which can move between a driving member 46 and a damping element 47, both of which work by magnetic principles. The oscillating motion can be achieved by using the same principle as an electric buzzer or bell, whereby current is supplied to the driving member 46 via an interrupter 48, 49 from a battery 50. The devices are connected in circuit by means of suitable conductors 52, 53 and a switch 51 passes or cuts off the supply of current thereto. The interrupter consists of a contact arm 48 which may suitably be attached to the upper pivot 38 and which actuates two normally open contact points 49 causing them to close when the contact arm moves against one of them. When current flows through a coil 54 on the member 46, a core in the coil is magnetized and repels the permanent magnet 46a on lever 41, causing it to swing from the driving member. Through a suitable choice of polarity in the permanent magnet 45 and the damping element 47, it is possible to achieve a smooth and speedy reversal of direction at the terminal position of the oscillatory movement. Corresponding damping is obtained when lever 41 swings back to the other terminal position due to the coil in driving member 46 again being magnetized at the correct moment. The damping properties can be improved by enclosing the damping elements in casings of a material with low specific resistance. Driving member 46 need not have an iron core but an iron core reduces current requirements. The interrupter mechanism is shown in FIG. 17 which is a horizontal cross-section through the upper pivot 38.

The illustrated mechanism for obtaining the oscillating motion of the reflector comprises only one example and many other ways of attaining this movement are possible without departing from the principle of this invention. It may be pointed out that in cases where mechanical elements are used for damping the oscilating motion, e.g. springs of a suitable type, it may be suitable to provide these with some form of heating to ensure that they retain their damping properties at low ambient temperatures. No such heating arrangement are required, of course, when magnetic damping elements are used.

I claim:

1. In a lighting system for vehicles, individual light units mounted on the vehicle for illuminating portions of the ground surface forwardly of the vehicle in the direction of travel of the vehicle, said system including at least one unit for long-distance illumination for use primarily as a passing light, one unit for short-distance illumination, and one unit for position indication of the vehicle, means mounting said long-distance unit on the top of the vehicle at a point remote from the center line of the ground surface being traveled, a light source for said long-distance unit, means operably related to said light source to focus finger-like beams of light in a vertical plane, whereby in a vertical plane approximately 44 yards in front of the vehicle, the solid angle of the best illuminated portions is less than 0.35 steradians for 50 percent of the luminous flux in said beams in the case said flux is demineated by locus curves for constant illumination intensity, and means for imparting a continuous oscillating movement of the beams of focused light laterally across the ground surface forwardly of the direction of travel of the vehicle, with the cycle period of such oscillating movement being longer than 0.5 seconds but shorter than 5 seconds, said short-distance unit including a light source, and means cooperable with the light source for focusing beams of light from the light source into first and second axially spaced lateral regions of illumination forwardly of the vehicle in relation to the direction of travel thereof, the area of at least one of the focused illuminated regions being less than approximately 60 percent of the area of the minimum circumscribed circle for the same region of illumination, then the curve for constant illumination at a distance less than approximately 66 yards forwardly of the vehicle at ground surface level delineates a luminous flux of high intensity that is approximately 50 percent of the luminous flux from the short-distance unit, said position indication unit having a light source and means operably related to said light source to emit from such light source non-focused light and focused light beams, the longitudinal axes of which are substantially to at least one side of the vehicle.

2. The lighting system as claimed in claim 1 in which the long-distance illumination unit includes a reflector for the light source and said driving mechanism being operably connected to the reflector for imparting an oscillating motion about an approximately vertical axis for effecting the oscillating motion of the beams.

3. The lighting system as claimed in claim 2 in which the reflector includes pivots, a swinging lever attached to at least one of the pivots, and a motion damping element in which each pivot is mounted and said oscillating motion imparting means actuating said lever at the end positions of its movement.

4. The lighting system as claimed in claim 3 in which the damping elements include permanent magnets, the poles of which are facing poles of the same polarity on a permanent magnet provided on the swinging lever.

5. The lighting system as claimed in claim 3 in which said lever cooperates with said motion damping elements and includes direct current operated solenoids stationarily located at the end positions of the lever and a permanent magnet on the lever having poles facing poles of the same polarity of the solenoids.

6. The lighting system as claimed in claim 4 in which at least one of the permanent magnets is provided with an adjacent damping circuit of electrically conducting material.

7. The lighting system as claimed in claim 1 in which the long-distance illumination unit includes a reflector for the light source and said driving mechanism including means giving a light source a lateral oscillating motion relative to the focal point of the reflector of said lamp for effecting the oscillating motion of the beams.

8. The lighting system as claimed in claim 1 including means for adjusting in a lateral direction the neutral position of the oscillating motion of the long-distance illumination unit.

* * * * *